United States Patent
Jau

(10) Patent No.: US 8,147,609 B2
(45) Date of Patent: Apr. 3, 2012

(54) NON-DISPERSIBLE CONCRETE FOR UNDERWATER AND UNDERGROUND CONSTRUCTION

(76) Inventor: Wen-Chen Jau, Hsinchu (TW)

( * ) Notice: Subject to any disclaimer, the term of this patent is extended or adjusted under 35 U.S.C. 154(b) by 625 days.

(21) Appl. No.: 11/802,241

(22) Filed: May 21, 2007

(65) Prior Publication Data

US 2008/0257221 A1 Oct. 23, 2008

(30) Foreign Application Priority Data

May 23, 2006 (CN) .......................... 2006 1 0080652

(51) Int. Cl.
*C04B 7/02* (2006.01)
(52) U.S. Cl. ........ 106/713; 106/705; 106/714; 106/724; 106/727; 106/823; 106/DIG. 1
(58) Field of Classification Search .................. 106/713, 106/724, 737, 705, 714, 727, 823, DIG. 1
See application file for complete search history.

(56) References Cited

U.S. PATENT DOCUMENTS

| | | | | |
|---|---|---|---|---|
| 4,502,887 A | * | 3/1985 | Tsuda ............................... | 524/8 |
| 4,743,301 A | * | 5/1988 | Ito et al. ............................ | 524/5 |
| 4,746,364 A | * | 5/1988 | Kawai et al. ...................... | 524/4 |

OTHER PUBLICATIONS

JP 01051356 (Nakano et al.) Feb. 27, 1989 abstract only.*
JP 01051356 (Nakano et al.) Feb. 27, 1989 Machine Translation in English.*
JP 61091053 (Yamakawa et al.) May 9, 1986 Abstract only.*
JP 61091053 (Yamakawa et al.) May 9, 1986 Machine Translation in English.*
JP 60260453 (Ishizuka et al.) Dec. 23, 1985 abstract only.*
JP 60260453 (Ishizuka et al.) Dec. 23, 1985 Machine Translation in English.*
JP 61072664 (Senda et al.) Apr. 14, 1986 abstract only.*
JP 61072664 (Senda et al.) Apr. 14, 1986 Machine Translation in English.*
JP 60239347 (Mori) Nov. 28, 1985 abstract only.*
JP 60239347 (Mori) Nov. 28, 1985 Machine Translation in English.*
JP 58190851 (Jobu) Nov. 7, 1983 abstract only.*
JP 58190851 (Jobu) Nov. 7, 1983 Machine Translation in English.*
KR 2002076726 (Kang) Oct. 11, 2002 abstract only.*
KR 2002076726 (Kang) Oct. 11, 2002 Machine Translation in English.*
Machine translation into English for JP 61091053 (May 9, 1986) Yamakawa et al.*

* cited by examiner

*Primary Examiner* — Paul Marcantoni
(74) *Attorney, Agent, or Firm* — Muncy, Geissler, Olds & Lowe, PLLC

(57) ABSTRACT

A non-dispersible concrete for underwater and underground construction is disclosed, whose composition primarily comprises: coarse aggregate in a range of from 600 to 1200 kgw/m$^3$; fine aggregate 500 to 1100 kgw/m$^3$, with a fineness modulus (F.M.) in a range of from 2.2 to 3.2; powder 300 to 700 kgw/m$^3$; mixing water 140 to 300 kgw/m$^3$; and cohesion-enhancing admixture (for example, polyacrylamide, PAA) whose solid content is 0.1 to 5.0 wt % of the powder. In addition, a SCC for underwater and underground construction is also developed and has excellent property of self-consolidation (its test value is 400 to 750 mm in slump flow spread test) and an appropriate compressive strength (between 14 to 70 MPa), so as can be widely applied to underwater and underground construction, whose composition further includes superplasticizer with solid content 0.1 to 3.0 wt % of the powder. Also, it covers: water to binder ratio (W/B) of 0.22 to 1.00, paste volume 0.25 to 0.60 m$^3$, and water/powder volume ratio 0.5 to 2.95.

24 Claims, 6 Drawing Sheets

NON-DISPERSIBLE CONCRETE FOR UNDERWATER AND UNDERGROUND CONSTRUCTION

FIELD OF THE INVENTION

The present invention relates generally to a non-dispersible concrete for underwater and underground construction which is added with cohesion-enhancing admixture with a slump from 5 to 27.5 cm, and more particularly to self-consolidating concrete (SCC) for underwater and underground construction, which features excellent property of self-consolidating (slump 400 to 750 mm) and appropriate strength (between 14 to 70 MPa).

BACKGROUND OF THE INVENTION

In general, the currently available concrete for underwater and underground construction is designed with an anti-washout agent and the use of larger content of cement and powder, limited water to cement ratio, (w/c, less than 0.5). Even if it is placed by tremie pipe, the quality and efficiency is uncontrollable. Shortcomings such as water/sand leakage, poor strength and non-uniformity are often caused by pile/wall breakage, soil/sand inclusion, pipe blockage and aggregate separation, etc. It indicates that, there is still much room for improvement of concrete for underwater and underground construction technology. A non-dispersible concrete for construction was developed first by West Germany, and marketed in 1977. It was further developed by Japan in the 1980s, and has now prevailed in today's concrete market. The shortcomings of traditional concrete for underwater and underground construction have been improved greatly due to the fact that this concrete was developed by mixing Anti-Washout Admixture (AWA) (Cellulose derivatives as major component) with higher-performance air-entraining agent (AE). Despite of the characteristic of self-leveling, this concrete for underwater and underground construction has some disadvantages, such as prolonged initial setting, lower initial strength, lower flow velocity and higher price, especially for its poor workability behind currently available SCC.

SUMMARY OF THE INVENTION

The major objective of the present invention is to provide a non-dispersible concrete for underwater and underground construction, whose composition includes: coarse aggregate, fine aggregates, water and powder, of which powder in a range of from 300 to 700 kgw/m$^3$. The solid content of cohesion-enhancing admixture is 0.1 to 5.0 wt % of powder. After mixing, water to binder ratio (w/b) of non-dispersible concrete is 0.2 to 1.0, paste volume 0.235 to 0.619 m$^3$, and the volume ratio of water to powder 0.438 to 3.15. As such, underwater and underground placing without dispersion nor segregation can be achieved, with a slump of 5 to 27.5 cm. In an engineering practice, the compressive strength measures between 14 to 70 MPa and is suitable for common underwater and underground construction.

Another objective of the present invention is to provide a self-consolidating concrete (SCC) for underwater construction, of which powder in a range of from 300 to 700 kgw/m$^3$. The solid content of cohesion-enhancing admixture and superplasticizer is 0.1 to 5.0 wt % and 0.1 to 3.0 wt % of powder, respectively. After mixing, water to binder ratio (w/b) of SCC is 0.22 to 1.0, paste volume 0.25 to 0.60 m$^3$, and the volume ratio of water/powder 0.5 to 2.95. As such, not only the underwater non-dispersion characteristics can be achieved, but also the workability meets the specification of SCC, and the compressive strength ranging between 14 to 70 MPa, which is suitable for common underwater construction.

Another objective of the present invention is to provide a non-dispersible and SCC for underwater construction. The powder contains at least cement. Pozzolan (e.g. ground granulated blast-furnace slag (GGBFS) or high-fineness slag, silica fume, fly ash, rice husk ash, zeolite powder), and non-binding inert material (e.g. but not limit to, limestone powder, basic oxygen furnace slag powder, air-cooling blast-furnace slag powder, olivine powder, dolomite powder, pyroxene powder, hornblende powder, calcite powder, plagioclase powder, quartz powder, orthoclase powder and silica powder) may be used. A portion of cement content may be replaced by pozzolan, and powder content may be supplemented by non-binding inert material. Thus, it is possible to achieve a non-separation self-consolidating concrete suitable for underwater and underground construction at low cement content, and also save the cost of concrete, thus improving its workability, pore structure of hardened concrete, higher later strength, reducing chloride penetration and chemical corrosion due to calcium sulfate and magnesium sulfate in soil and seawater.

Another objective of the present invention is to provide a design processes and mixing methods for the non-dispersible concrete for underwater and underground construction.

Another objective of the present invention is to provide design processes and mixing methods for the SCC for underwater and underground construction.

The present invention provides a non-dispersible concrete for underwater and underground construction, whose composition includes: coarse aggregate in the range 600 to 1200 kgw/m$^3$; fine aggregates 500 to 1100 kgw/m$^3$; fineness modulus (F.M.) 2.0 to 3.2; powder 300 to 700 kgw/m$^3$, which at least contains cement; and pozzolan, such as ground granulated blast-furnace slag (GGBFS), silica fume, fly ash, rice husk ash and zeolite powder, or non-binding inert material; mixing water 140 to 300 kgw/m$^3$; and the solid content of cohesion-enhancing admixture (e.g.: polyacrylamide) 0.1 to 5.0 wt % of powder; the solid content of added superplasticizer (liquid or powdery) 0.1 to 3.0 wt % of powder (where necessary), or the solid content of AE (liquid or powdery) 0.1 to 2.0 wt % of powder. A non-dispersible concrete for underwater and underground construction is developed with a slump of 5 cm to 27.5 cm. After mixing, water to binder ratio (w/b) of non-dispersible concrete is 0.2 to 1.0, paste volume 0.235 to 0.619 m$^3$, and the volume ratio of water to powder 0.438 to 3.150.

The present invention also provides a SCC for underwater and underground construction, whose composition includes: coarse aggregate in the range of 600 to 1100 kgw/m$^3$; fine aggregates 500 to 1100 kgw/m$^3$, its fineness modulus (F.M) 2.2 to 3.2; powder 300 to 700 kgw/m$^3$, which at least contains cement; mixing water 140 to 300 kgw/m$^3$; the solid content of cohesion-enhancing admixture 0.1 to 5.0 wt % of powder; the solid content of superplasticizer (liquid or powdery) 0.1 to 3.0 wt % of powder. After mixing, water to binder ratio (w/b) of SCC is 0.22 to 1.0, paste volume 0.25 to 0.60 m$^3$, and the volume ratio of water to powder 0.5 to 2.95, compressive strength 14 to 70 MPa, all of which are suitable for underwater construction.

Of which, cohesion-enhancing admixture is available with:
1. Non-ionic: Polyacrylamide, polyoxyalkylene, and polysaccharide.
2. Cationic: cationic modified polyacrylamide, aminomethyl compound, polyethylenimine, polymethylacrylate, poly vinyl pyridine, poly vinylimidazole.

3. Anionic: some hydrolytic polyacrylamide, poly sodium acrylate, polypropylene sodium sulfonate, poly sodium methylacrylate, sodium alginate.
4. Cellulose derivatives: Hydroxyethyl Cellulose (HEC), Hydroxypropyl Cellulose (HPC), Hydroxypropylmethyl Cellulose (HPMC), Methyl Cellulose (MC) and Carboxymethyl Cellulose (CMC).

DETAIL DESCRIPTION OF THE INVENTION

Figure 1:
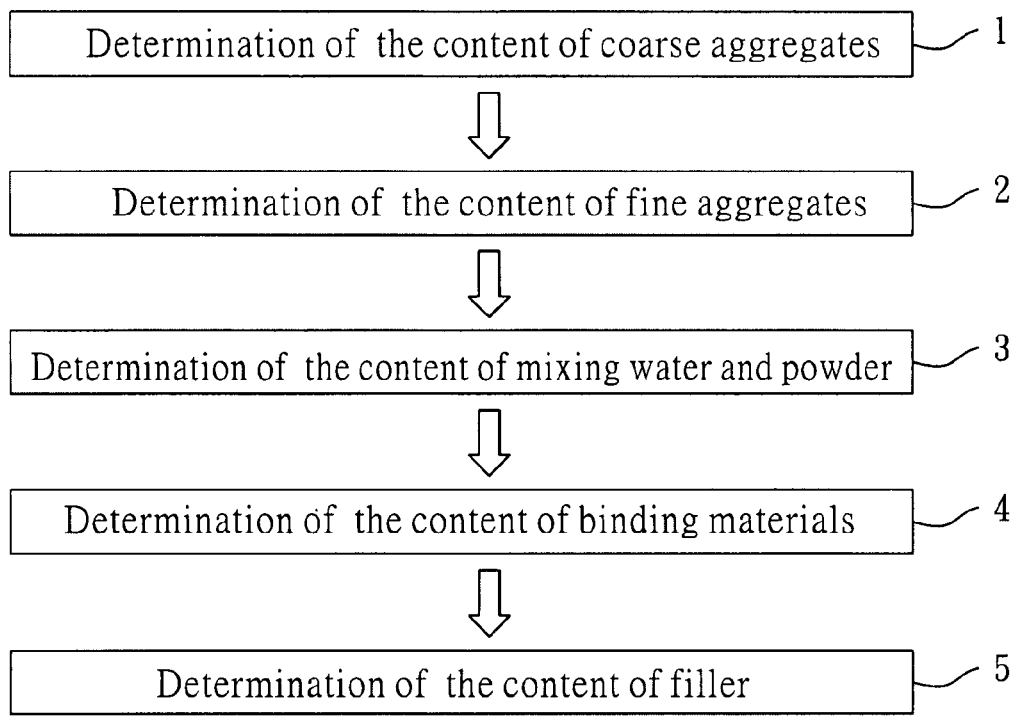
FIG. 1 shows the mixing design process diagram of non-dispersible concrete and SCC for underwater and underground construction of the present invention.

The features and the advantages of the present invention will be more readily understood through the following detailed description of a preferred embodiment with reference to the accompanying drawings.

The present invention provides a non-dispersible concrete and a SCC for underwater and underground construction, either of which features non-dispersion. The ratio of the oven dry coarse aggregate content (G, unit: kgw/m$^3$) to bulk specified gravity ($G_{lim}$, unit: kgw/m$^3$) of coarse aggregate ($G/G_{lim}$) is categorized according to the grade of self-consolidation. The content of coarse aggregate ($G_{ssd}$) is practically between 600 to 1200 kgw/m$^3$.

Fine aggregate has a smaller particle diameter than coarse aggregate, and fineness modulus (F.M.) between 2.2 to 3.2. The volume ($V_{sand}$) of fine aggregate is obtained from the volume of SCC minus paste volume ($V_{paste}$), volume ($V_g$) of coarse aggregate and air content (A). The fine aggregate in weight is obtained from its unit volume multiplied by its specific gravity, i.e. $V_{sand}=1-V_{paste}-V_g-A$; S (fine aggregate in weight)$=V_{sand} \times \gamma_{sand}$, of which $\gamma_{sand}$ represents specific weight of fine aggregate, which is about 2700 kgw/m$^3$. In the present invention, fine aggregate content (S) is between 500 to 1100 kgw/m$^3$, or preferably between 600 to 850 kgw/m$^3$. Mixing water content (W) is obtained from paste volume ($V_{paste}$) and the volume ratio of water to powder ($V_w/V_{powder}$), i.e. $W=V_{paste} \div (1+(V_{powder}/V_w)) \times 1000$, generally between 140 to 300 kgw/m$^3$.

Powder, with particle diameter less than fine aggregates, contains at least binders or non-binding inert material. Binder generally refers to at least cement, and may contain pozzolan of binding ability. In general, a lower water/binder ratio means a higher demand on the quantity of binding material and high strength. Some portions of cement can be replaced by pozzolan, which can save both the content and cost of cement while maintaining outstanding non-disperse property (cement is the most expensive material of concrete). Pozzolan may be Ground Granulated Blast-Furnace Slag (GGBFS), high fineness slag (blaine>6000 cm$^2$/g), silica fume, fly ash, rice husk ash, and zeolite powder, or any derivative. The content of binding material content (B) (e.g. cement and pozzolan) is obtained from water content (W) divided by water to binder ratio (W/B), i.e. B=W÷(W/B), and $V_{bind}$ (volume of binding material)=C(cement content)/$\gamma_{cem}$(specific weight of cement approx. 3150 kg/m$^3$)+SL (slag content)/$\gamma_{sl}$(specific weight of slag approx. 2940 kg/m$^3$)+SF (silica fume content)/$\gamma_{sf}$(specific weight of silica fume approx. 2250 kg/m$^3$).

Insufficient portion of powder is supplemented by non-binding inert material, which can be, but not limited to limestone powder, converter slag powder, air-cooling blast-furnace slag powder, olivine powder, dolomite powder, pyroxene powder, hornblende powder, calcite powder, plagioclase powder, quartz powder, orthoclase powder and silica powder, or any derivative. In general, the combined content of pozzolan and non-binding inert material is below 90 wt % of total powder. In the present invention, the powder content is 300 to 700 kgw/m$^3$, or preferably 400 to 550 kgw/m$^3$.

Cohesion-enhancing admixture, for example, polyacrylamide (PAA), can be applied for underwater and underground construction. It contains Acrylamide and its derivatives such as homopolymer and copolymer. Available types are water-soluble colloid, powder and emulsion, each type has cationic, anionic, or non-ionic.

Alternatively, cohesion-enhancing admixture can be, but not limited to polyoxyalkylene, polysaccharide, Aminomethyl compound, polyethylenimine, poly methylacrylate amine, poly vinylimidazole, poly vinyl pyridine, cellulose derivatives, poly sodium acrylate, poly propylene sodium sulfonate, poly sodium methylacrylate, sodium alginate. The major function of cohesion-enhancing admixture is to agglutinate cement and powder against separation when concrete is placed in water. In the present invention, the solid content of cohesion-enhancing admixture is 0.1 to 5.0 wt % of powder.

Non-dispersible concrete for underwater and underground construction of the present invention also contains optionally superplasticizer or air-entraining agent (AE), of which superplasticizer is used to disperse cement particle for lubrication and yield high flowing property with low mixing water. In the present invention, the solid content of liquid or powdery superplasticizer is 0.1 to 3.0 wt % of powder.

Air-entraining agent (AE), also referred to as interfacial agent, primarily is used to improve workability of concrete and ensure strong resistance to frost. In the present invention, the solid content of (liquid or powdery) air-entraining agent (AE) is 0.1 to 2.0 wt % of powder.

After non-dispersible concrete for underwater and underground construction is mixed, water to binder ratio (W/B) is in a range from 0.2 to 1.0, paste volume 0.235 to 0.619 m$^3$, and water to powder volume ratio 0.438 to 3.150.

FIG. 1 depicts the mix design process, which contain: step 1: "determination of the content of coarse aggregate", step 2: "determination of the content of fine aggregates", step 3: "determination of the content of mixing water and powder", step 4: "determination of the content of binding material" and step 5: "determination of the content of filler" described in the first preferred embodiment:

In the first preferred embodiment, 28-day compressive strength of a non-dispersible concrete for underwater and underground construction is 28 MPa, coarse aggregate's bulk specific gravity ($G_{lim}$) 1470 kgw/m$^3$, absorption ratio ($W_w/W$) 1.07%, fine aggregate's fineness modulus (F.M.) 2.8, absorption ratio ($W_w/W$) 1.7%; and, paste volume ($V_{paste}$) 0.367 m$^3$, the volume ratio of water to powder ($V_w/V_{powder}$) 1.5. Firstly, in step 1 of "the content of coarse aggregate", coarse aggregate's maximum particle diameter ($D_{max}$) is 2.5 cm. Assuming the ratios $G/G_{lim}$ is 0.65, the content of oven dry coarse aggregate (G)=($G/G_{lim}$)×$G_{lim}$=0.65×1470=956 kgw/m$^3$, the content of coarse aggregate ($G_{ssd}$)=G×[1+($W_w/W$)]=956×(1+1.07%)=966 kgw/m$^3$, the volume of coarse aggregate ($V_g$)=G÷$\gamma_d$=956÷2600=0.368 m$^3$; in step 2 of "the content of fine aggregates", if air content (A) is set as 5%, the volume of fine aggregate $(V_{sand})$=1−0.05−0.367−0.368=0.215 m$^3$, the content of fine aggregates $(S_{sand})$=0.215×2700=580 kg/m$^3$; in step 3 of "the content of mixing water and powder", mixing water (W)=0.367/(1+1/1.5)×1000=220 kgw/m$^3$, powder $(V_{powder})$=220/1.5/1000=0.1467 m$^3$; in step 4 of "the content of binding material", if the targeted strength is 28 MPa, water/binder ratio(W/B) is 0.489, gross content of binding material (B)=220÷0.489=450 kgw/m$^3$. If the ratio of cement:GGBFS in weight is 2:1, then cement content is 300 kg/m$^3$, GGBFS 150 kgw/m$^3$; coarse aggregate 956 kgw/m$^3$, fine aggregates 580 kgw/m$^3$. In this embodiment, the solid content of superplasticizer is about 0.7 wt % (3.15 kgw/m$^3$) of powder; the solid content of cohesion-enhancing admixture (PAA) is 0.5 wt % (2.25 kgw/m$^3$) of powder; the solid content of air-entraining agent (AE) is 0.08% (0.36 kgw/m$^3$) of powder. After trial mix, the slump is 18 cm; 28-day compressive strength 32.5 MPa, 91-day compressive strength 40.8 MPa for concrete placed in water; 28-day compressive strength from the concrete of normal placing (in air) is 34 MPa, 91-day compressive strength 44.2 MPa, and the strength ratio for the concrete specimens made in water and in air is 0.95 and 0.92 for 28 and 91 days respectively.

The present invention also provides a SCC for underwater and underground construction. The volume of paste $(V_{paste})$ is the summation of water volume and powder volume. To ensure a good slump flow (400 to 750 mm), water to powder ratio $(V_w/V_{powder})$, which refers to the volume ratio of water and powder, is used to control the deformation of paste and suspending aggregates.

Coarse aggregate refers to crushed stone or pebble. The maximum size of coarse aggregate is selected depending upon clear spacing of reinforced steel bars, with the particle diameter less than $[2/(2+\sqrt{3})]$ times of clear spacing of one-way reinforcement, or $[2/(2+2\sqrt{2})]$ times of two-way reinforcement. For example, maximum particle diameter of coarse aggregate is 20 mm, clear spacing of one-way reinforcement shall not be less than 37 mm, and that of two-way reinforcement not less than 48 mm. Otherwise, coarse aggregate would be blocked and arched between reinforced bars. The ratio of the $G/G_{lim}$ of coarse aggregate is categorized according to the grade of passing ability. The content of coarse aggregate $(G_{ssd})$ is between 600 to 1100 kgw/m$^3$, or preferably between 700 to 850 kgw/m$^3$.

After SCC for underwater and underground construction is mixed, water to binder ratio (w/b) is 0.22 to 1.0, the volume of paste 0.25 to 0.60 m$^3$, the volume ratio of water to powder 0.5 to 2.95. FIG. 1 depicts the mix design processes, which contain: step 1: "the content of coarse aggregate", step 2: "the content of fine aggregates", step 3: "the content of mixing water and powder", step 4: "the content of binding material" and step 5: "the content of filler" described in the second preferred embodiment:

In the second preferred embodiment, 28-day compressive strength of a SCC for underwater and underground construction is 21 MPa, the bulk specific gravity of coarse aggregate $(G_{lim})$ 1470 kgw/m$^3$, absorption ratio $(W_{w}/W)$ 1.07%, the fineness modulus (F.M) of fine aggregates 2.8, absorption ratio $(W_{w}/W)$ 1.7%; and, paste volume $(V_{paste})$ 0.45 m$^3$, the volume ratio of water to powder $(V_w/V_{powder})$ 1.70. Firstly, in step 1 of "the content of coarse aggregate", the maximum particle diameter of coarse aggregate $(D_{max})$=4×[2/(2+$\sqrt{3}$)]=2.14 cm, which set as 2.54 cm. If the required grade of passing ability is R2, and the ratio of the $G/G_{lim}$ is 0.50, the content of oven dry coarse aggregate $(G)=(G/G_{lim})\times G_{lim}$=0.50×1470=739 kgw/m$^3$, the content of coarse aggregate $(G_{ssd})$=G×[1+$(W_w/W)$]=739×(1+1.07%)=747 kgw/m$^3$, the volume of coarse aggregate $(V_g)$= G÷$\gamma_{ssd}$=739÷2600=0.284 m$^3$; in step 2 of "the content of fine aggregates", if air content (A) is set as 5%, the volume of fine aggregates $(V_{sand})$=1−0.05−0.45−0.284=0.216 m$^3$, the content of fine aggregates $(S_{sand})$=0.216×2700=583 kgw/m$^3$; in step 3 of "the content of mixing water and powder", mixing water (W)=0.45/(1+1/1.70)×1000=283 kgw/m$^3$, powder $(V_{powder})$=283/1.70/1000=0.166 m$^3$; in step 4 of "the content of binding material", water/binder ratio (W/B) is 0.566, gross content of binding material (B)=283÷0.566=500 kgw/m$^3$. If the ratio of cement:GGBFS is 60:40, then cement content is 300 kgw/m$^3$, GGBFS 200 kgw/m$^3$, mixing water 280 kgw/m$^3$ (the content of pozzolan is 40 wt % of gross powder content), coarse aggregate 747 kgw/m$^3$, fine aggregates 583 kgw/m$^3$. In this embodiment, the solid content of superplasticizer is about 1.3% (6.5 kgw/m$^3$) of powder; the solid content of cohesion-enhancing admixture (PAA) is 0.5 wt % (2.25 kgw/m$^3$) of powder; the solid content of air-entraining agent (AE) is 0.08% (0.4 kgw/m$^3$) of powder.

Figure 2:
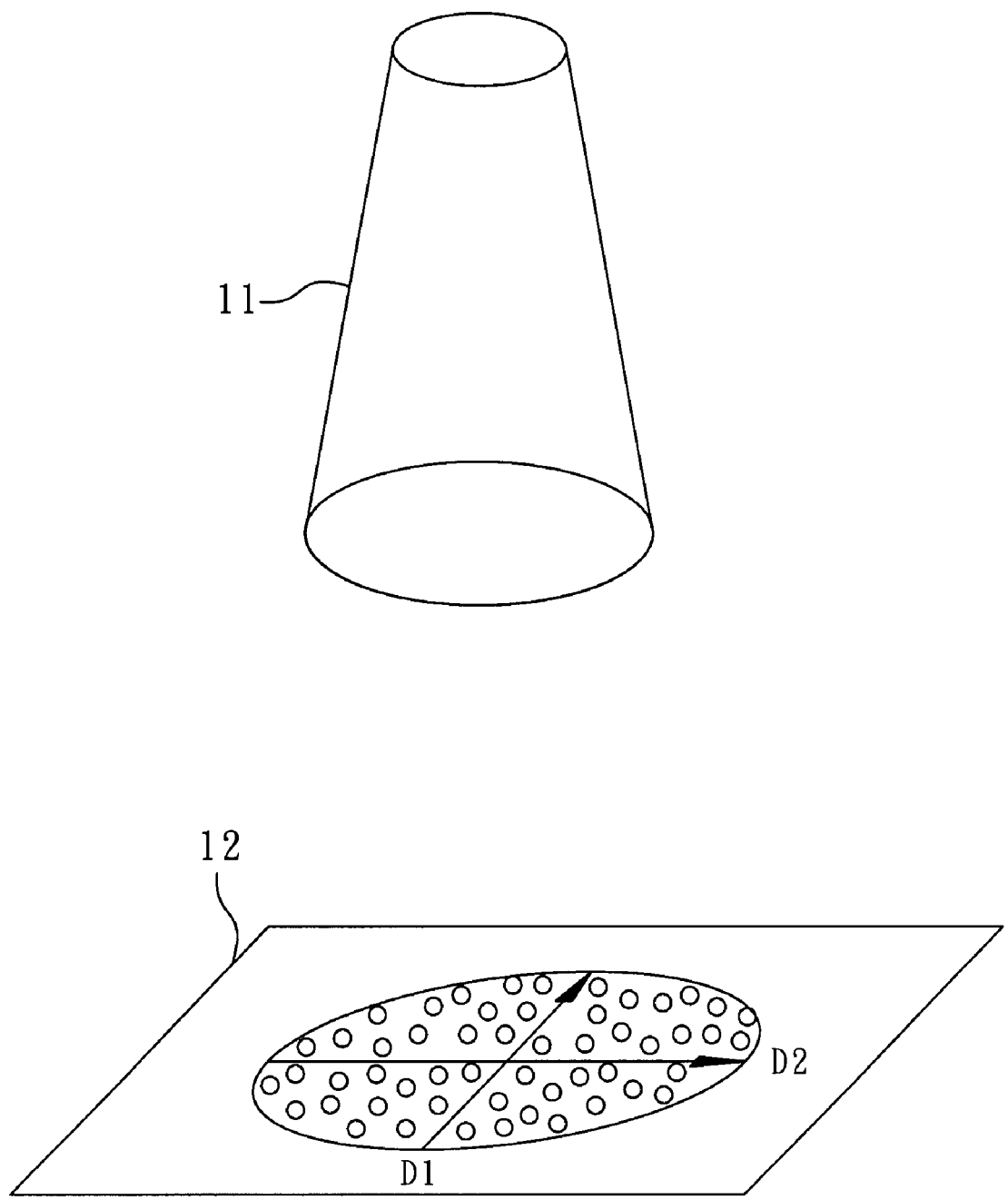
FIG. 2 shows the schematic drawing of slump flow test device.
Figure 3:
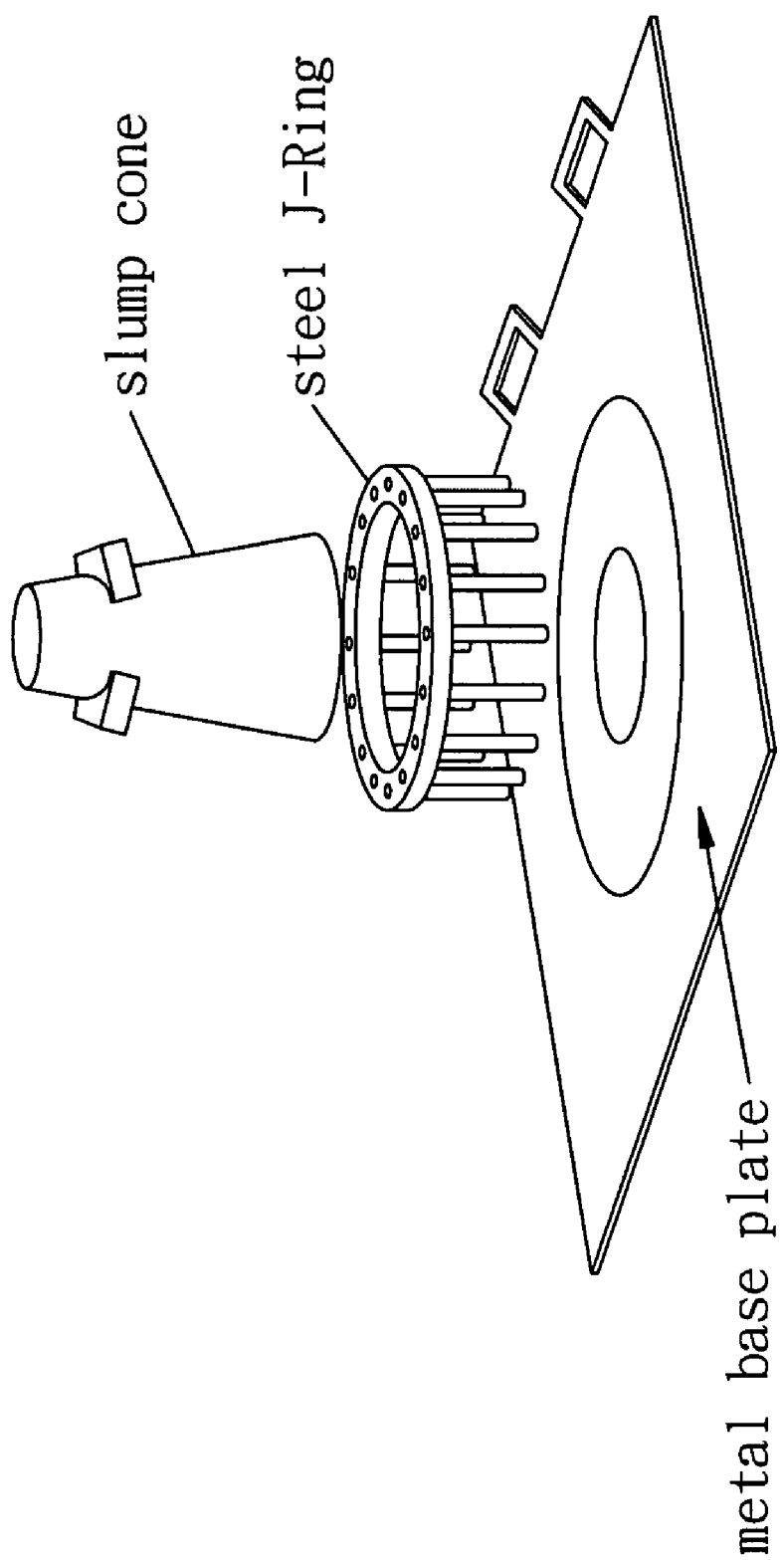
FIG. 3 shows J-Ring test apparatus for concrete.

After SCC for underwater and underground construction is mixed, the slump test, slump flow test, J-Ring test, V-funnel test, U-test and L-flow test were performed. Slump flow test is used to test the flowing property of concrete in order to achieve the required slump (26 cm over) and slump flow (400 to 750 mm, 3 to 25 seconds for spread diameter up to 50 cm), with the test device for slump flow shown in FIG. 2. Firstly, SCC for underwater and underground construction is filled into circular cylinder 11 over a plate 12. The circular cylinder 11 has two openings, 10 cm-diameter and 20 cm-diameter, with a cylinder height of 30 cm. After filling, circular cylinder 11 is lifted vertically. In such case, SCC spread on plate 12, where it's required to measure the time of spread up to 50 cm, and the spread diameter as the slump flow stops to spread. The passing ability of SCC measured by J-Ring (ASTM C 1621) is shown in FIG. 3. In the second preferred embodiment, SCC can meet the criteria of final slump flow spread of 400 to 750 mm and 3 to 25 seconds to reach a spread diameter of 50 cm.

Figure 4:
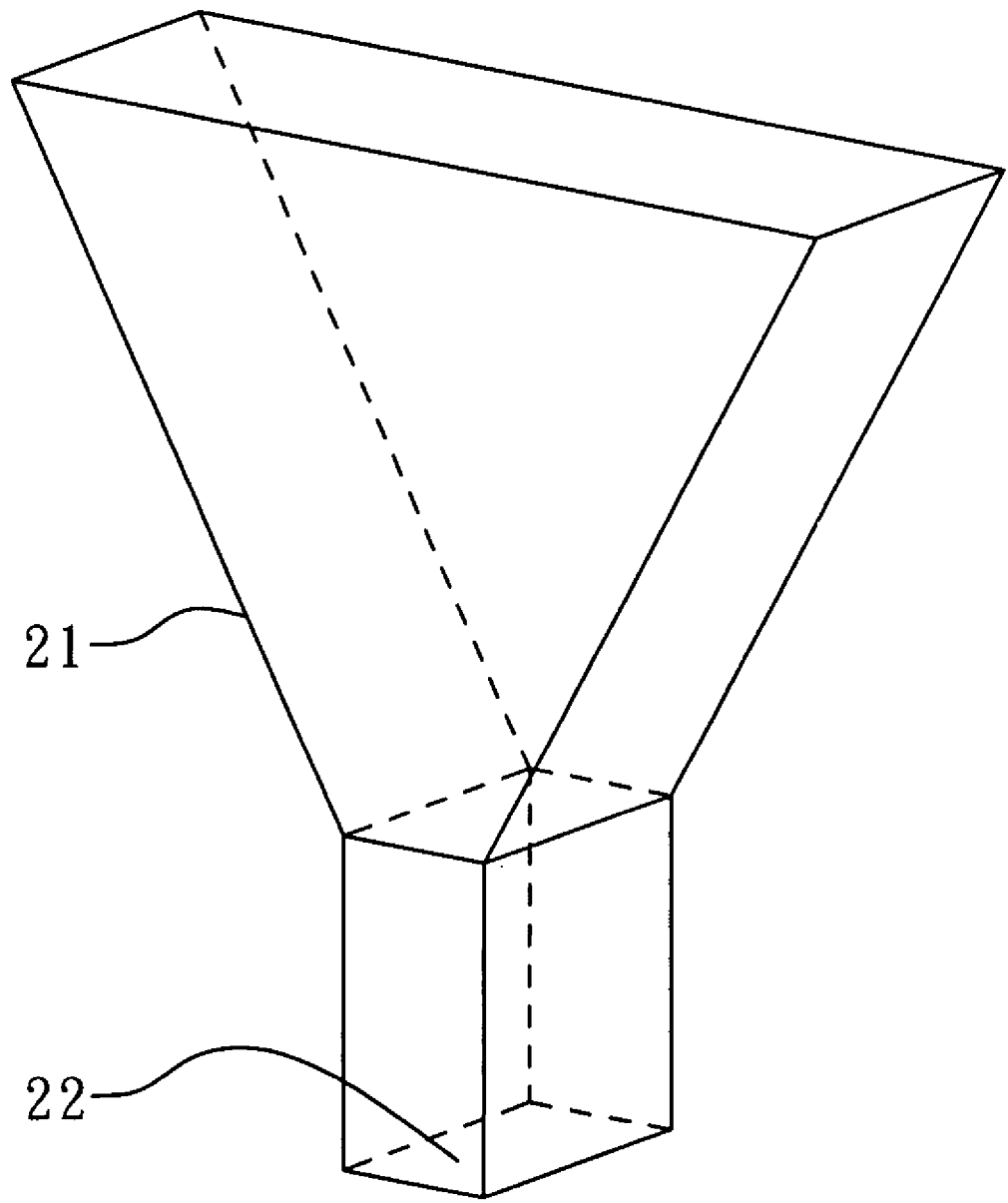
FIG. 4 shows the schematic drawing of V-funnel test.

V-funnel flow test is used to test consistency and segregation of SCC for underwater and underground construction. As illustrated in FIG. 4, the test device is a V-funnel 21, at lower part of which has an outlet 22 (6.5 cm×7.5 cm), where the pipe length is 15 cm. V-funnel 21 is 7.5 cm in width and 45 cm in height, with a 49 cm upper flange. In the first preferred embodiment, SCC for underwater construction meets the criteria of 7 to 20 seconds flow time of V-funnel.

Figure 5:
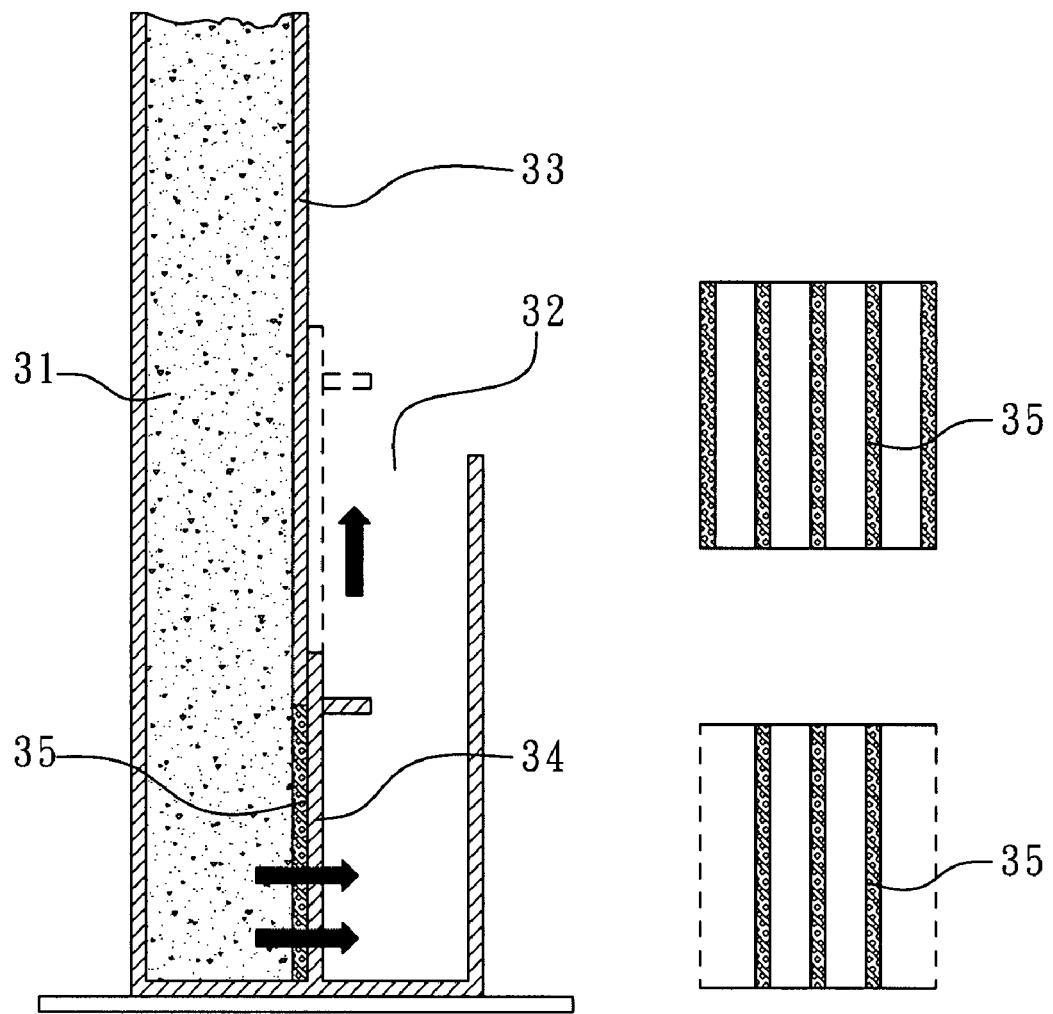
FIG. 5 shows the schematic drawing of U-box test for passing ability through reinforcement.

Passing ability through reinforcement (or U-test) is used to test the capability of SCC for underwater and underground construction to pass through the steel bars and filling to corners of forms. As illustrated in FIG. 5, passing ability through reinforcement is to fill SCC into room A31 (height of 49 cm) of the test device, where room A31 and room B32 is separated by a middle wall 33. A sliding door 34 and a reinforcement obstacle 35 are mounted on middle wall 33. Different reinforcement obstacle 35 are installed, depending upon the class of self-consolidation. In the case of R3, no reinforcement obstacle 35 shall be installed. One minute after SCC for underwater and underground construction is placed into room A31, movable gate 34 is opened, and SCC in room A31 flows towards room B32. In the preferred embodiment, SCC for underwater and underground construction flows into room B32 at least 300 mm in height. Thus, it is justified from slump test, slump flow test, V-funnel flow test, U-test that, SCC in this invention for underwater and underground construction features excellent self-consolidating ability.

Figure 6:
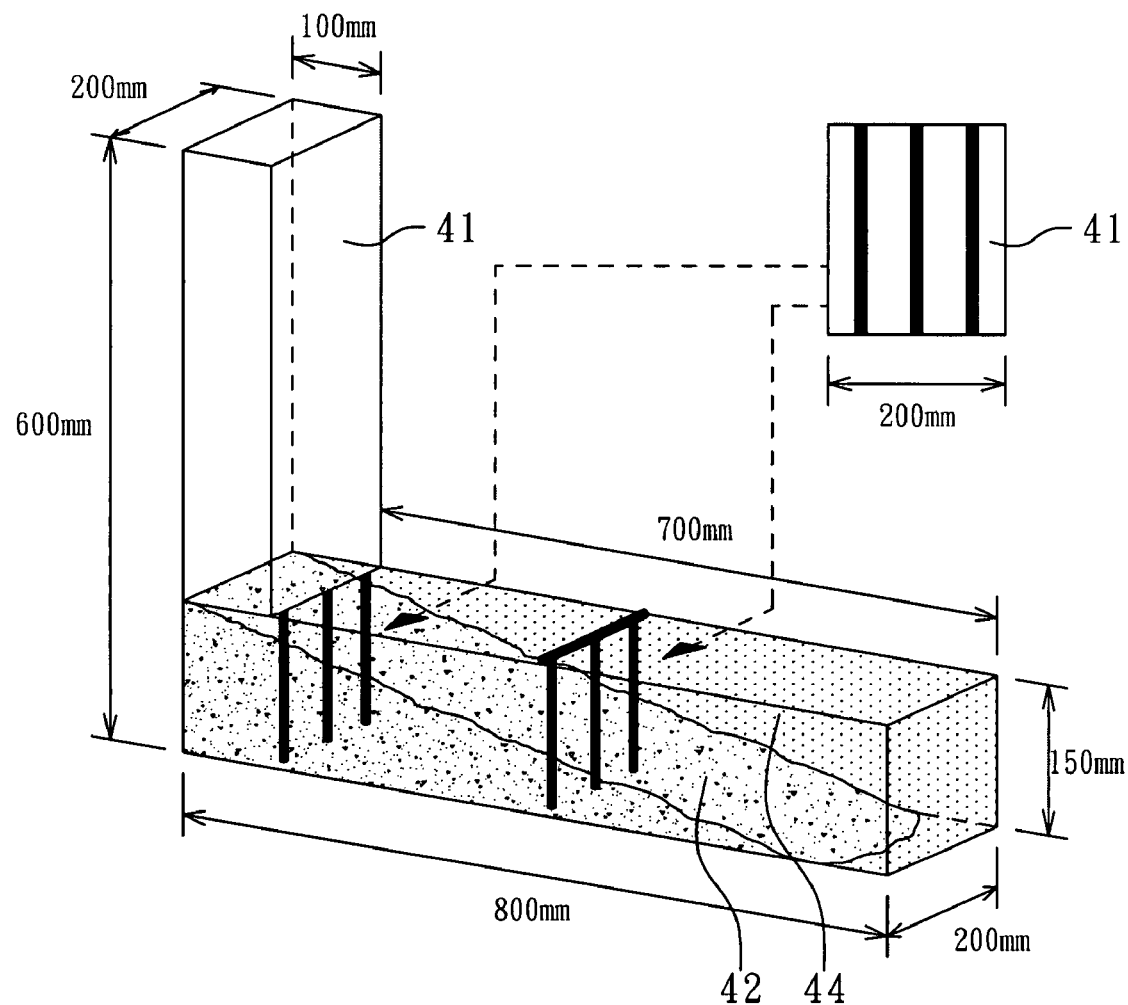
FIG. 6 shows the schematic drawing of L-flow test.

L-flow test is used to test the capability of SCC passing through two-layered R2 steel bars. As illustrated in FIG. 6, underwater flow of concrete and its resistance to segregation can be visualized. In L-flow test, SCC for underwater and underground construction is filled into room A41 of the test device (volume of 20×10×60 cm), where room A41 and room B42 are separated by a partition plate. A movable partition plate and a reinforcement gate 43 (R2 obstacle) are mounted on the partition plate. Meanwhile, a movable reinforcement gate 43 is installed in the middle of room B, and room B42 is filled with water 44. One minute after SCC for underwater construction is placed into room A41, movable partition plate is pulled upward, and SCC in room A41 flow towards room B42. In the second preferred embodiment, SCC for underwater and underground construction flows into room B42 up to 500 mm. After test, no segregation occurs and water remains clear and clean in the invention, but segregation occurs when conventional SCC passing through L-box. On a comparative basis, the invention provides a SCC for underwater and underground construction which features a strong non-dispersible feature in water.

When the non-dispersible concrete in the present invention and a conventional concrete for underwater construction are placed and cured in water, we found the compactness of non-dispersible concrete in the present invention is much higher than that of conventional concrete.

On one hand, when the non-dispersible concrete in the present invention is either placed, through a tremie pipe, and cured in water or in air, the non-dispersible concrete placed in the water has a compressive strength of 21.2 MPa at 28-day and 27.6 MPa at 91-day; the same concrete placed in air has a compressive strength of 22.2 MPa at 28-day and 29.5 MPa at 91-day. Accordingly, the strength ratio of compressive strength between the two concrete placed either in water or in air in the invention is 0.95 (28-day) and 0.94 (91-day).

On the other hand, when a conventional SCC placed, through a tremie pipe, and cured in water or in air, the conventional placed in the water has a compressive strength of 19.4 MPa at 28-day and 25.4 MPa at 91-day; the same concrete placed in air has a compressive strength of 35.2 MPa at 28-day and 47 MPa at 91-day. Accordingly, the strength ratio of compressive strength between the two concrete placed either in water or in air in the invention is 0.55 (28-day) and 0.54 (91-day).

In the second preferred embodiment, SCC for underwater and underground construction has high flowing property and self-consolidation, a higher strength ratio compared to the specimens made in air, proper compressive strength for general construction (above 21 MPa), and is free of segregation for underwater and underground construction (see the following table).

| Reference Value of SCC for Underwater and Underground Construction (Recommended Value): | | | | | |
|---|---|---|---|---|---|
| Class of Consolidation | | | 1 | 2 | 3 |
| Conditions of construction | Minimum spacing of reinforced bars (mm) | | 30~60 | 60~200 | Above 200 |
| | Quantity of reinforced bars (kgw/m$^3$) | | Above 350 | 100~350 | 100 below |
| Filling height of U-flow test or Box test (mm) | | | Above 300 (obstacle R1) | Above 300 (obstacle R2) | Above 300 (without obstacle) |
| Flowing property | Slump flow (mm) | | 550~700 | | 500~650 |
| Segregation resistance | Flow time of funnel test (sec) | $V_{75}^{(1)}$funnel | 10~20 | 7~20 | 7~20 |
| | | $S_{100}$ funnel$^{(2)}$ | 4~8 | 3~8 | 3~8 |
| | Time to reach the spreading diameter of 500 mm (sec) | | 5~25 | 3~15 | 3~15 |

Note
$^{(1)}V_{75}$ funnel refers to a V-funnel with a cross section of discharge port size of 75 mm × 75 mm.
$^{(2)}S_{100}$ funnel refers to a hollow cylindrical funnel made of steel. The straight pipe has an adjustable upper flange, a smooth inner wall of 98 mm-diameter and 800 mm-height, with a capacity of 6.28 L, an opening at both ends, a discharge port at bottom fitted with a fast-switching, water-tight valve.

Therefore, non-dispersible concrete and non-dispersible SCC for underwater and underground construction of the present invention features appropriate strength, higher slump flow, self-consolidation and segregation resistance. And, fc'$_{uw}$/fc'$_{air}$ which is higher than the recommended value of JSCE-D 104 at 80%, is suitable for common underwater and underground construction.

The present invention provides a highly stable non-dispersible concrete for underwater and underground construction, with a slump of 5 to 27.5 cm during placing. Preferably, a SCC is also provided, which meets the requirement of self-consolidating, has a higher slump flow (400 to 750 mm and 3 to 25 seconds required for spreading diameter up to 50 cm), the passing ability of SCC measured by J-Ring (400 to 750 mm), U-flow test or Box test filling height (above 300 mm), V-funnel flow time (7 to 20 second) and L test exceeding 500 mm, and appropriate compressive strength (28/91-day 14 to 70 MPa) without segregation. It can be widely applied to underwater and underground constructions. In addition, the present invention also discloses mixing proportions design and mixing methods for a non-dispersible concrete.

Although the invention has been explained in relation to its preferred embodiment, it is to be understood that many other possible modifications and variations can be made without departing from the spirit and scope of the invention as hereinafter claimed.

What is claimed is:

1. A self-consolidating concrete composition comprising:
   coarse aggregate in a range of from 600 to 1100 kgw/m$^3$;
   fine aggregate with a fineness modulus between 2.2 to 3.2, in a range of from 500 to 1100 kgw/m$^3$;
   powder containing at least cement, in a range of from 300 to 700 kgw/m$^3$;
   mixing water;
   cohesion-enhancing admixture; and
   superplasticizer;
   when the SCC composition is mixed, the water/cementitious material ratio is 0.22 to 1.00, paste volume 0.25 to 0.60 m$^3$, and water to powder volume ratio 0.5 to 2.95;

wherein the cohesion-enhancing admixture has a solid content of 0.1 to 5.0 wt % of the powder, the superplasticizer has a solid content of 0.1 to 3.0 wt % of the powder, the cohesion-enhancing admixture is used in a manner that the SCC composition has a flow value exceeding 500 mm under a L-flow test in which a bottom room is filled with water.

2. The self-consolidating concrete composition as claimed in claim 1, wherein the cohesion-enhancing admixture is made of polyacrylamide.

3. The self-consolidating concrete composition as claimed in claim 1, wherein the cohesion-enhancing admixture contains acrylamide and its derivatives selected from the group consisting of homopolymer and copolymer, available in the form of a water-soluble colloid, powder and emulsion, in cationic, anionic, or non-ionic form.

4. The self-consolidating concrete composition as claimed in claim 1, wherein the cohesion-enhancing admixture is selected from the group consisting of polyoxyalkylene, polysaccharide, Aminomethyl compound, polyethylenimine, poly methylacrylate amine, poly vinylimidazole, poly vinyl pyridine, poly sodium acrylate, cellulose derivatives, polypropylene sodium sulfonate, poly sodium methylacrylate and sodium alginate.

5. The self-consolidating concrete composition as claimed in claim 1, wherein the mixing water content is from 140 to 300 kgw/m$^3$.

6. The self-consolidating concrete composition as claimed in claim 1, wherein the cured SCC has a compressive strength of 14 to 70 MPa.

7. The self-consolidating concrete composition as claimed in claim 1, wherein the powder further contains pozzolan.

8. The self-consolidating concrete composition as claimed in claim 7, wherein the pozzolan is selected from the group consisting of ground granulated blast-furnace slag, silica fume, fly ash, rice husk ash and zeolite powder.

9. The self-consolidating concrete composition as claimed in claim 7, wherein the powder further contains non-binding inert material.

10. The self-consolidating concrete composition as claimed in claim 9, wherein the non-binding inert material is selected from the group consisting of limestone powder, converter slag powder, air-cooling blast-furnace slag powder, olivine powder, dolomite powder, pyroxene powder, hornblende powder, calcite powder, plagioclase powder, quartz powder, orthoclase powder, and silica powder.

11. The self-consolidating concrete composition as claimed in claim 9, wherein the combined content of the pozzolan and the non-binding inert material is below 90 wt % of the powder.

12. The self-consolidating concrete composition as claimed in claim 1, further comprising an air-entraining agent having a solid content in a range of from 0.1 to 2.0 wt % of the powder.

13. A method of forming concrete underwater or underground, said method comprising the steps of:
providing a self-consolidating concrete composition comprising:
coarse aggregate in a range of from 600 to 1100 kgw/m$^3$;
fine aggregate with a fineness modulus between 2.2 to 3.2, in a range of from 500 to 1100 kgw/m$^3$;
powder containing at least cement, in a range of from 300 to 700 kgw/m$^3$;
mixing water;
cohesion-enhancing admixture; and
superplasticizer;
when the SCC composition is mixed, the water/cementitious material ratio is 0.22 to 1.00, paste volume 0.25 to 0.60 m$^3$, and water to powder volume ratio 0.5 to 2.95;
wherein the cohesion-enhancing admixture has a solid content of 0.1 to 5.0 wt % of the powder, the superplasticizer has a solid content of 0.1 to 3.0 wt % of the powder, the cohesion-enhancing admixture is used in a manner that the SCC composition has a flow value exceeding 500 mm under a L-flow test in which a bottom room is filled with water; and
injecting said composition to a desired location underwater or underground.

14. The method as claimed in claim 13, wherein the cohesion-enhancing admixture is made of polyacrylamide.

15. The method as claimed in claim 13, wherein the cohesion-enhancing admixture contains acrylamide and its derivatives selected from the group consisting of homopolymer and copolymer, available in the form of a water-soluble colloid, powder and emulsion, in cationic, anionic, or non-ionic form.

16. The method as claimed in claim 13, wherein the cohesion-enhancing admixture is selected from the group consisting of polyoxyalkylene, polysaccharide, Aminomethyl compound, polyethylenimine, poly methylacrylate amine, poly vinylimidazole, poly vinyl pyridine, poly sodium acrylate, cellulose derivatives, polypropylene sodium sulfonate, poly sodium methylacrylate and sodium alginate.

17. The method as claimed in claim 13, wherein the mixing water content is from 140 to 300 kgw/m$^3$.

18. The method as claimed in claim 13, wherein the cured SCC has a compressive strength of 14 to 70 MPa.

19. The method as claimed in claim 13, wherein the powder further contains pozzolan.

20. The method as claimed in claim 19, wherein the pozzolan is selected from the group consisting of ground granulated blast-furnace slag, silica fume, fly ash, rice husk ash and zeolite powder.

21. The method as claimed in claim 19, wherein the powder further contains non-binding inert material.

22. The method as claimed in claim 21, wherein the non-binding inert material is selected from the group consisting of limestone powder, converter slag powder, air-cooling blast-furnace slag powder, olivine powder, dolomite powder, pyroxene powder, hornblende powder, calcite powder, plagioclase powder, quartz powder, orthoclase powder, and silica powder.

23. The method as claimed in claim 21, wherein the combined content of the pozzolan and the non-binding inert material is below 90 wt % of the powder.

24. The method as claimed in claim 13, further comprising an air-entraining agent having a solid content in a range of from 0.1 to 2.0 wt % of the powder.

* * * * *